(12) United States Patent
Suddreth et al.

(10) Patent No.: US 12,033,528 B2
(45) Date of Patent: Jul. 9, 2024

(54) DISPLAY SYSTEMS AND METHODS

(71) Applicant: HONEYWELL INTERNATIONAL INC., Charlotte, NC (US)

(72) Inventors: John G. Suddreth, Cave Creek, AZ (US); Jerry Ball, Litchfield Park, AZ (US); Kenneth Leiphon, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 761 days.

(21) Appl. No.: 17/167,861

(22) Filed: Feb. 4, 2021

(65) Prior Publication Data

US 2022/0246048 A1    Aug. 4, 2022

(51) Int. Cl.
*G06K 9/00* (2022.01)
*B60R 11/04* (2006.01)
*G08G 5/06* (2006.01)

(52) U.S. Cl.
CPC .............. *G08G 5/065* (2013.01); *B60R 11/04* (2013.01); *B60R 2300/105* (2013.01);
(Continued)

(58) Field of Classification Search
CPC .............. B60R 1/00; B60R 2300/8093; B60R 2300/105; B60R 2300/301; B60R 2300/302; B60R 1/083; B60R 1/12; B60R 1/26; B60R 11/04; B60R 2001/1215; B60R 2001/1253; B60R 2300/207; B60R 2300/30; B60R 2300/306; B60R 2300/304; B60R 2300/605; G06T 7/74; G06T 19/00; G06T 17/05; G06T 19/003; G06T 19/20; G06T 2219/028; G06T 2219/2004;
(Continued)

(56) References Cited

U.S. PATENT DOCUMENTS 6,686,850 B2   2/2004   Hausmann
6,694,064 B1 *  2/2004   Benkelman ........... G06T 3/4038
                                                           382/284
(Continued)

FOREIGN PATENT DOCUMENTS

CN      107168356 A     9/2017
EP      1906151 A2      4/2008
(Continued)

*Primary Examiner* — Alex Kok S Liew
(74) *Attorney, Agent, or Firm* — Lorenz & Kopf LLP

(57) ABSTRACT

An image processing system for generating a display for a vehicle. The image processing system receives images, respectively, from a plurality of cameras mounted on the vehicle. The field of view of the plurality of cameras at least partially overlaps. The field of view of one or more of the plurality of cameras includes a region underneath the vehicle. The images are transformed to a common reference plane using a perspective transformation algorithm and based on intrinsic and extrinsic parameters of the plurality of cameras, to thereby obtain a projected image. The projected image is projected to the common reference plane. A display is generated based on the projected image. The display includes a synthetic depiction of the vehicle including an outer profile. The display includes an image area within the outer profile that is based on the projected image for the region underneath the vehicle.

19 Claims, 3 Drawing Sheets

(52) U.S. Cl.
CPC ... *B60R 2300/302* (2013.01); *B60R 2300/303* (2013.01); *B60R 2300/607* (2013.01); *B60R 2300/806* (2013.01)

(58) Field of Classification Search
CPC . G06T 2207/10032; G06T 2207/20084; G06T 2207/30252; G06T 2207/10021; G06T 7/579; G06T 7/70; G06T 2207/10028
See application file for complete search history.

(56) References Cited

U.S. PATENT DOCUMENTS

| | | | |
|---|---|---|---|
| 7,800,645 | B2 | 9/2010 | Nonoyama et al. |
| 8,761,457 | B1 | 6/2014 | Seitz et al. |
| 9,154,717 | B2 | 10/2015 | Ferrano et al. |
| 10,311,297 | B2 | 6/2019 | Greveson et al. |
| 2014/0063243 | A1 | 3/2014 | Giuffrida et al. |
| 2014/0247352 | A1* | 9/2014 | Rathi ............... G06V 20/56 348/148 |
| 2015/0116495 | A1* | 4/2015 | Kowatari ............ H04N 7/181 348/148 |
| 2016/0300113 | A1* | 10/2016 | Molin ................. H04N 23/90 |

FOREIGN PATENT DOCUMENTS

| | | | |
|---|---|---|---|
| EP | 2174834 | A2 | 4/2010 |
| WO | 2009065003 | A1 | 5/2009 |

* cited by examiner

DISPLAY SYSTEMS AND METHODS

TECHNICAL FIELD

The present disclosure generally relates to systems and methods for generating a composite display based on images received from a plurality of cameras mounted to a vehicle. More particularly, the present disclosure relates to surround view displays.

BACKGROUND

Surround view display systems are available in Advanced Driver Assistance Systems, particularly for providing parking assistance. Such systems provide a display including a top-down view of 360 degree surroundings of the vehicle. Some systems include four to six wide-angle (fish-eye lens) cameras mounted around the vehicle, each facing a different direction. From these camera inputs, a composite view of the surroundings of the vehicle is synthesized and shown to the driver in real-time during parking. The images from each camera are transformed and combined so as to be presented in the display from a bird's eye view virtual camera located a defined distance above the vehicle. Surround view parking assistance systems have time limited applicability when the vehicle is travelling slowly during a parking operation.

Hence, it is desirable to provide systems and methods that extend the applications of surround view displays. Yet further, it is desirable to provide aircraft display systems providing enhanced situational awareness, particularly during landing operations. Further, it is desirable to provide methods and systems for displaying a composite view from a plurality of cameras that more realistically reflects a stable virtual camera positioned above the vehicle. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

This Section to be Completed Once Claims Agreed with Inventors

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
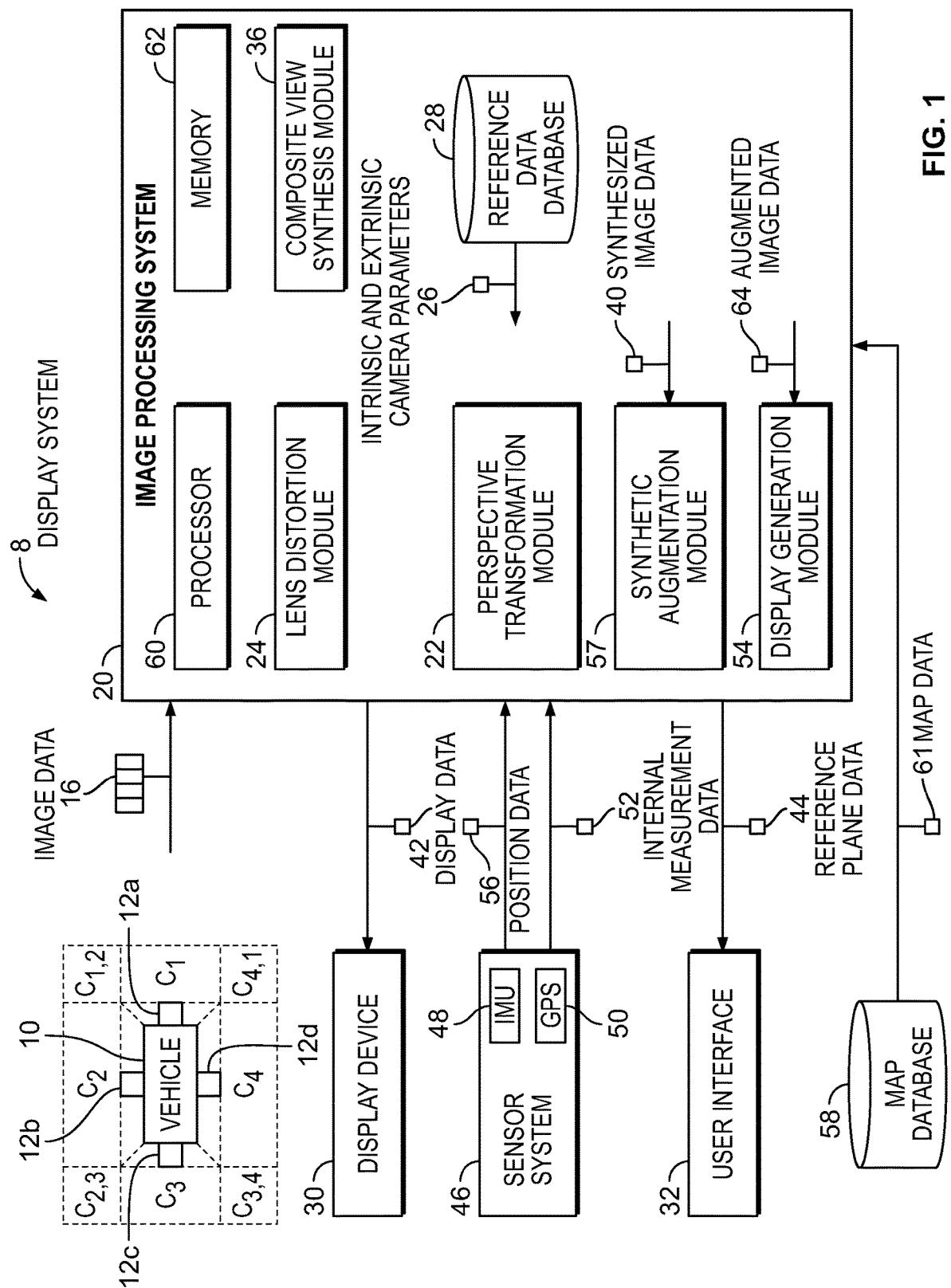
FIG. 1 depicts a display system, in accordance with an embodiment of the present disclosure.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

In one aspect, methods and systems disclosed herein provide a camera based "see-through" display having particular utility for aircraft tactical operations. The systems and methods disclosed herein are applicable to aircraft (such as helicopters and winged aircraft) and also to ground and sea vehicles. In current aircraft, pilots have limited visibility horizontally around and under the aircraft. The present disclosure proposes systems and methods in which images from plural cameras mounted around the vehicle are subjected to perspective transformation processing and combined so that a display can be generated in which the images are projected onto a common reference plane. In this way, a surround view can be provided from a virtual camera located at a set position relative to the vehicle.

In one embodiment, the system includes cameras mounted around/under the vehicle. The camera/lens intrinsic data are collected on the cameras/lenses. Based on the position of the camera and direction, the pixels of each of the cameras are projected to a common reference plane a specified height under the aircraft. The display is rendered from a direct top/down or third person view. In one embodiment, the display includes an icon representing the vehicle, with one or more areas that are see-through where camera images are available. In this way, a top down or third person view of the camera image plane with perspective correction is provided. In an embodiment, the display is generated to include further symbology such as rotor outline for a helicopter application. A natural facet of the perspective transform is that vertical items in the camera image above the specified height of the projected image plane will be accentuated (elongated) the further they are away from the vehicle. This image artefact that may be seen as disadvantageous in certain fields provides heightened awareness to a pilot of objects that could impact a rotor or other part of an aircraft, for example. The systems disclosed herein, when applied to aircraft, provides a near vehicle situational awareness not possible from a pilot or passenger seat, or even from individual camera images where the pilot would have to stitch together such images in his/her mind. In one use case, the pilot can use the generated display for tactical hover, landing and or search and rescue operations as cameras mounted below the fuselage would effectively allow the user to see through the aircraft. In some embodiments, the distance to the common reference plane may be automatically or user adjusted.

In some embodiments, inertial sensors are utilized to stabilize the display. Inertial sensors may additionally be used to compensate for camera/system latency and to correct the camera image position relative to the aircraft icon. Using the inertial sensor for image stabilization provides some key features. First, a ground image remains stabilized such that no pitching, yawing, or rolling action is seen in ground or surrounding terrain, even as the vehicle is pitching, rolling, yawing (i.e. sliding in mud or loose dirt). Second, the displayed vehicle image pitches, rolls, yaws relative to the stabilized ground image. These two features mimic an actual virtual drone camera view, from above looking down on the vehicle, as the vehicle is moving and pitching/rolling/yawing and not the ground.

In some embodiments, inertial or navigation sensors are utilized to Earth/geo reference the image. The earth or geo-referenced referenced image can be inserted into a top down lateral map type display. In other embodiments, the geo referenced image can be mapped onto polygons representative of a terrain database in a top down or synthetic vision display. In some embodiments, user or system control of the displayed lateral distance of the image is possible. System top down range visibility control may be limited based on altitude above terrain via geo altitude or radio altitude as distortion increases proportionally with lateral distance and altitude.

Some aspects of the present disclosure apply inertial correction in projecting a display plane which is conformal to the earth, parallel to the earth's surface, while the vehicle is pitching and rolling relative to the earth's surface. This projection emulates a drone shot (a view as though from above) of the vehicle in which the drone is not pitching, rolling, or yawing relative to earth. The inertially stabilized or corrected projection plane(s) are mostly disclosed herein to be parallel to the earth's surface but could be any angle relative to earth's surface in other embodiments. The herein described inertial measurement compensated projections could be generated using either inertial or satellite based systems, position/orientation systems or a combination thereof. In some embodiments, the generated display has a track up or heading up display orientation. Although many embodiments described herein propose a top-down view, the common reference plane may be otherwise oriented so as to provide a side view image (e.g. including the vehicle at 0 deg pitch to 10 deg pitch) or so as provide a back view image of the vehicle (e.g. including 0 deg roll to 10 deg roll).

FIG. 1 illustrates a display system 8 for a vehicle 10. The display system 8 includes, inter alia, the vehicle 10, an image processing system 20, a sensor system 46, a user interface 32 and a map database 58. The display system 8 may be wholly or partially located on the vehicle 10. Some elements may be remotely located such as the display device 30, the map database 58 and at least some parts of the image processing system 20. The display system 8 combines and applies perspective transform operations to images so as to project the images onto a common reference plane so as to appear to be taken from a virtual camera displaced away from the vehicle 10 such as with a drone camera hovering vertically above or at some other angle from the vehicle 10. The display system 8 stabilizes the synthesized image based on inertial measurement data from the sensor system 46 so as to appear to be taken from the virtual camera at a fixed location relative to the common reference plane even when the vehicle 10 is subject to pitching, rolling and/or yawing that would shift the common reference plane without the inertial correction. The display system 8 further combines images that include a region underneath the vehicle 10 and generates a display that shows a graphic of the vehicle 10 including one or more see-through areas in which the part of the synthesized image from the region underneath the vehicle 10 is seen.

The vehicle 10 may be a land, air or sea vehicle. In terms of land vehicles, two, four or more wheeled vehicles are contemplated. In terms of air vehicles, aircraft of all kinds are contemplated. The aircraft can be a multicopter (or rotary-wing), fixed-wing or a tilt-wing aircraft. The aircraft can be an airplane or a helicopter or other aircraft with powered rotors, such as cyclogyros/cyclocopters and tiltrotors. The sea vehicle can be any form of sea vessel or boat including motor powered boats and hovercraft.

The vehicle 10 includes a plurality of cameras 12a to 12d distributed around the vehicle 10. The cameras 12a to 12d may be wide angle or fish-eye cameras. In the exemplary embodiment, the vehicle 10 includes first to fourth cameras 12a to 12d but other numbers of cameras are possible including three to six or more. The cameras 12a to 12d have respective fields of views $C_1$ to $C_4$ that are at least partially overlapping. That is, the first and second fields of view $C_1$, $C_2$ of the first and second cameras 12a, 12b overlap in field of view in the area $C_{1,2}$. The second and third fields of view $C_2$, $C_3$ of the second and third cameras 12b, 12c overlap in the field of view area $C_{2,3}$. The third and fourth fields of view $C_3$, $C_4$ of the third and fourth cameras 12c, 12d overlap in the field of view area $C_{3,4}$. The fourth and first fields of view $C_4$, $C_1$ of the fourth and first cameras 12d, 12a overlap in the field of view area $C_{4,1}$. Thus, according to the exemplary embodiment, adjacent cameras 12a to 12d have a partly overlapping field of view and the sum of the fields of view $C_1$ to $C_4$ of the cameras 12a to 12d fully surrounds the vehicle 10. The fields of view $C_1$ to $C_4$ of at least one or some of the cameras 12a to 12d extend vertically beneath the vehicle 10 so as to include a region under the vehicle 10. In some embodiments, some or all of a plane extending parallel to an underside of the vehicle 10 is included within the fields of view $C_1$ to $C_4$ of the cameras 12a to 12d. The cameras 12a to 12d each output respective frames of image data 16 to the image processing system 20. The image processing system 20 combines and transforms time synchronized frames of image data 16 to produce a single frame of synthesized image data 40, as will be described further herein.

The display system 8 includes a user interface 32. The user interface 32 includes one or more of a keyboard, joystick, multi-way rocker switches, mouse, trackball, touch screen, touch pad, data entry keys, a microphone suitable for voice recognition, and/or any other suitable device. The user interface 32 allows a user to adjust characteristics of a display shown on the display device 30. Various options can be selected by a user including to provide a combined terrain and perspective transformed view, a combined lateral map and perspective transformed view, a track up or heading up option for the perspective transformed view as examples of many possible display options that can be set by the user. Another parameter that may be set by the user through the user interface 32 is a position and orientation of the common reference plane. The user may adjust a height beneath the vehicle 10 for the common reference plane. A perspective (i.e. a position of the virtual camera) may also be adjusted so as to allow perspective transformed views from a front of the vehicle 10, a rear of the vehicle 10 or from either side of the vehicle 10. Generally, a view from above the vehicle 10 is desirable. When the virtual camera is set so as to be positioned above the vehicle 10, the common reference plane extends substantially parallel to the ground (when the ground is flat) or perpendicular to a vertical direction and is positioned beneath the vehicle 10. The vertical position of the common reference plane relative to the vehicle 10 can be adjusted through the user interface 32. The vertical height can be adjusted as a relative value (e.g. a certain distance from the vehicle 10) or as an absolute value (e.g. a certain altitude). The common reference plane may be set to the ground plane. The user interface 32 thus produces reference plane data 44 describing a position and orientation of the common reference plane. The image processing system 20 receives the reference plane data 44 and projects the frames of image data 16 received from each camera 12a to 12d onto the common reference plane described by the reference plane data 44.

Figure 2:
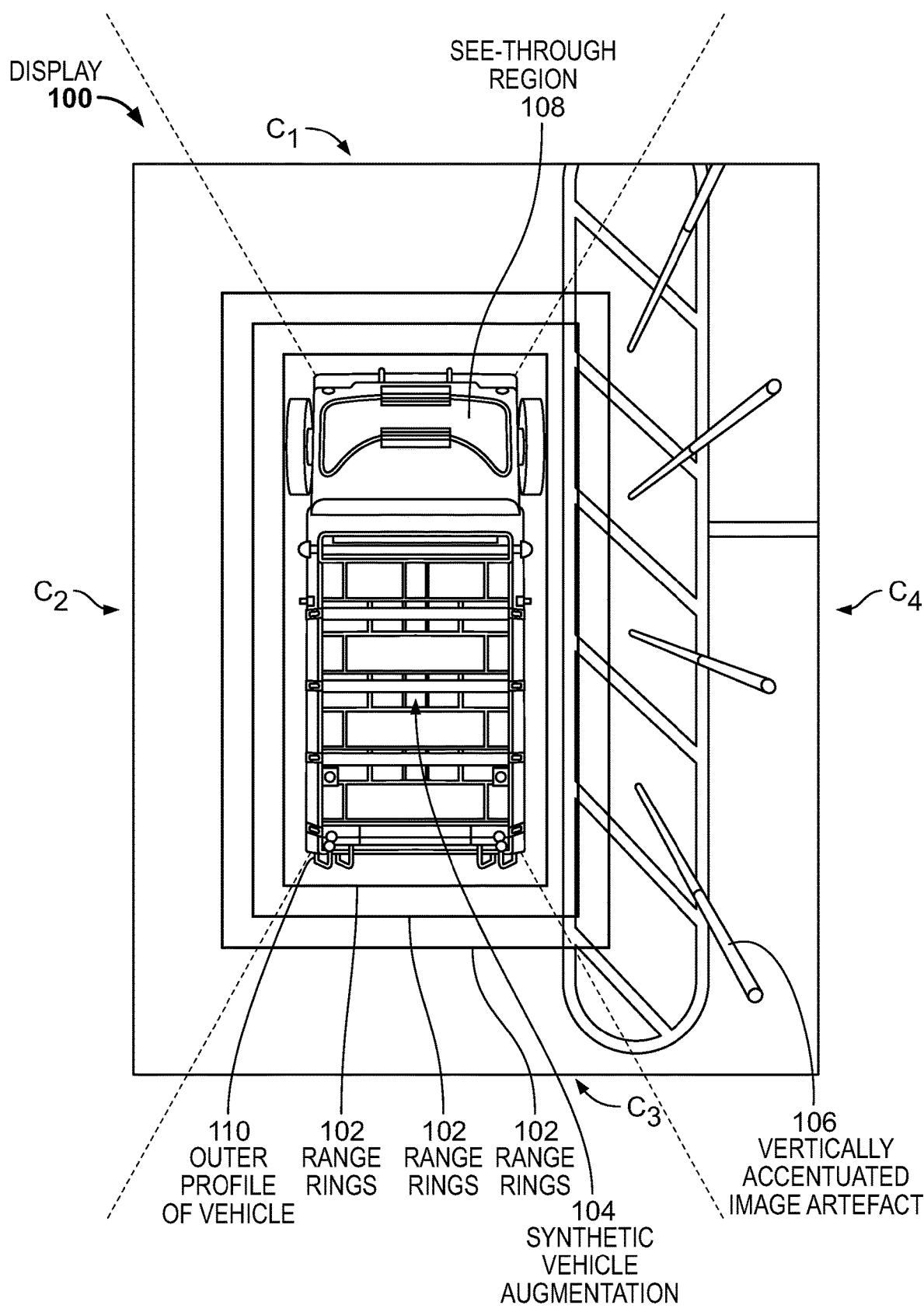
FIG. 2 depicts a display generated by the display system of FIG. 1, in accordance with an embodiment of the present disclosure.

The display system 8 includes a display device 30. The display device 30 includes Electroluminescent (ELD) displays, Liquid crystal displays (LCD), Light-emitting diode (LED) displays, Plasma (PDP) displays, etc. In embodiments, the display device 30 includes a head down display (HDD), a head up display (HUD), a wearable HUD, a portable display or any combination thereof. The display device 30 may be dashboard/cockpit integrated display or an Electronic Flight Bag (EFB) device. The display device 30 receives display data 42 from the image processing system 20 and presents a display to the driver or pilot based on the display data 42. An exemplary presented display 100 is shown in FIG. 2 and will be described further below. Briefly, the display 100 includes a graphic depicting the vehicle 10 and a perspective transformed and combined form of the image data 16 from the plurality of cameras 12a to 12d. The display 100 may include a surround view provided from the perspective of a virtual camera positioned above the vehicle 10 and include image information for a region beneath the vehicle 10.

The display system 8 includes the sensor system 46, which includes at least an inertial measurement unit (IMU) 48 and a GPS unit 50. The GPS unit 50 may include a Global Positioning System (GPS) or global navigation satellite system (GNSS) receiver. The IMU 48 includes one or more gyroscopes and accelerometers. The sensor system 46 determines location and orientation information for the vehicle 10 based on global position data obtained from satellites, e.g. by trilateration with three or more satellites and based on inertial measurements. In some embodiments, the sensor system 46 determines location of the vehicle 10 based on Wide Area Augmentation System (WAAS) or other augmented satellite-based global position data. A network of ground-based reference stations provides measurements of small variations in the GPS satellites' signals so that onboard GPS or GNSS receivers use the corrections while computing their positions to improve accuracy of location measurements. The sensor system 46 may additional or alternatively include other sensors to allow the global position and orientation of the vehicle 10 to be derived. The sensor system 46 provides inertial measurement data 52, which describes pitching, yawing and rolling of the vehicle 10. The sensor system 46 further provides position data 56, which describes a global position of the vehicle 10. The position data 56 is output to the image processing system 20 to allow the image data 16 to be geo-referenced to any kind of map from the map database 58 so that the perspective transformed image can be position registered to a map such as a lateral map, a terrain map, etc. The inertial measurement data 52 allows the image processing system 20 to positionally transform the common reference plane in dependence on the inertial measurement data 52, which will allow the display to be seen from the perspective of a stable virtual camera even when the vehicle 10 is pitching, rolling and/or yawing.

The map database 58 can provide a variety of map data 61 including terrain maps, lateral maps, road maps, infrastructure maps and combinations thereof. Of particular interest for aircraft applications would be a geo-referenced transformed image in combination with a lateral (top down) map and/or a terrain map. For example, a navigation display may be generated or a synthetic vision display may be generated showing terrain, buildings, infrastructure, etc. For ground vehicle applications, road features may be extracted from the map database 58 and geo-referenced with the live perspective transformed imaging.

The display system 8 includes an image processing system 20 including a processor 60, memory 62, lens distortion module 24, perspective transformation module 22, synthetic augmentation module 57, reference data database 28, composite view synthesis module 36 and a display generation module 54. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality. In an embodiment, the various modules are implemented by way of computer programming instructions stored on memory 62 and executed by the processor 60. The memory 62 can include one or more computer-readable media, including, but not limited to, non-transitory computer-readable media, RAM, ROM, hard drives, flash drives, or other memory devices.

The processor 60 and the computer program instructions on the memory 62 perform the processing activities of the image processing system 20. The processor 60 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The image processing system 20 receives image data 16 including frames of images from respective cameras 12a to 12d and applies a series of image processing steps in order to arrive at synthesized image data 40, which describes a combined and projected image frame. The lens distortion module 24 applies lens distortion correction to the image data 16, which removes lens effects and may include radial and tangential undistortion functions. When the cameras 12a to 12d are fish-eye cameras, a radial distortion model is used to execute fish-eye distortion correction by applying an inverse transformation of a radial distortion function. Each camera 12a to 12d may require a different undistortion function because of differences in the cameras 12a to 12d.

The perspective transformation module 22 utilizes intrinsic and extrinsic camera parameters 26 from a reference data database 28. The intrinsic and extrinsic camera parameters 26 can be determined from a camera calibration processes. A variety of camera calibration processes are known in the art. In one such process, intrinsic camera parameters are known from information from the manufacturer. The extrinsic camera parameters can be determined by including calibration charts in the fields of view $C_1$ to $C_4$ of the plurality of cameras 12a to 12d including the overlapping field of view areas $C_{1,2}$, $C_{2,3}$, $C_{3,4}$ and $C_{4,1}$ at precisely known positions. A frame from each camera is captured simultaneously. The position in the camera images are corresponded with the known positions of the calibration charts in the real world co-ordinate system with a pre-defined origin (e.g. center of the vehicle 10). Using these correspondences, the homography of the camera image plane to the world co-ordinates is determined. The extrinsic pose of the cameras 12a to 12d in the world coordinate system is derivable from the homography. Based on the intrinsic and extrinsic parameters 26, the perspective transformation module 22 is able to map each location in the input image data 16 to a common reference plane defined by the reference plane data 44. The perspective transformation module 22 is able to transform undistorted image data from a plurality of cameras 12a to 12d onto a common reference plane. Since the common reference plane can be adjusted based on the reference plane data 44, a perspective of the resulting image can be changed. That is, a position of a virtual camera is able to be changed, wherein the virtual camera produces an output image that combines the image data 16 and changes the perspective of the image data 16 to fit the selected position of the virtual camera.

In one embodiment, the perspective transformation module 22 corrects the common reference plane described by the reference plane data 44 using inertial measurement data 52. Without this correction, pitching, rolling and/or yawing of the vehicle 10 will result in image artefacts as though the virtual camera were likewise pitching, rolling and/or yawing. However, the common reference plane can be rotated based on the inertial measurement data 52 so as to counteract the pitching, rolling and/or yawing. In this way, fixed parts in the image data 16 will remain fixed as the vehicle pitches, rolls or yaws. That is, the synthesized image data 40 will appear as though from a stabile virtual camera irrespective of pitching, rolling and yawing of the vehicle 10. That is, the perspective transformation module 22 re-projects the image described in the image data 16 from the common reference plane to a another plane relative to the vehicle or the world.

The composite view synthesis module 36 can apply a variety of functions to enhance the integrity or stitching of the perspective transformed image. A phonetic alignment function may be applied to provide better color matching in the output image as the cameras 12a to 12d may each provide images having different color properties. A geometric alignment function may be applied that automatically pattern or feature matches between each image from the cameras 12a to 12d to enhance the geometric stitching in the output image. In the overlapping area of the fields of view $C_1$ to $C_4$ any of a variety of blending functions can be applied where there will be image data from two cameras that must be merged. It should be appreciated that the image processing system 20 does not necessarily operate in the order of lens distortion correction, perspective transformation and composite view synthesis. It is possible to reorder these steps and still produce synthesized image data 40 depicting a combined and perspective transformed single frame of output image data based on the incoming frame of image data 16 from different cameras 12a to 12d having different perspectives.

The synthetic augmentation module 57 provides a graphical or synthetic depiction of the vehicle 10 to scale and positionally correct with respect to the input synthesized image data 40. The graphical vehicle will be shown from a perspective and a scale that will be adjusted depending on location and orientation of the common reference plane. That is, as the axis of the virtual camera changes, the perspective of a virtual vehicle would change and the synthetic augmentation module 57 adapts accordingly. Similarly, as the zoom of the virtual camera changes based on the location of the common reference plane relative to the vehicle 10, so the size of the virtual vehicle would change. The synthetic augmentation module 57 receives, as inputs, information representing the location and orientation of the virtual camera and generates a graphical depiction of the virtual vehicle from a perspective, and at a scale, that accords with the virtual camera information. The synthetic augmentation module may utilize a 3D realistic model of the vehicle 10 to generate the graphical depiction or a simplified line model may be utilized or some other method for generating a graphical depiction of the vehicle can be utilized. In addition, the synthetic augmentation module 57 may apply pitch, roll or yaw movements to the graphical depiction of the vehicle 10 based on the inertial measurement data 52 to enhance the realism of the generated augmented image data 64. In aircraft embodiments, the graphical depiction of the aircraft may include a graphical depiction of a fuselage of the aircraft and the wings. In helicopter embodiments, a body of the helicopter and a path of the rotor blade tips may be graphically depicted.

In some embodiments, the synthetic augmentation module 57 combines the synthesized image data 40, the map data 61 and the position data 56 to provide the synthesized image data 40 and the graphical depiction of the vehicle 10 at a location geo-referenced with respect to a map described by the map data 61. In this way, a composite map and live images display can be generated. The map data 61 may include terrain map features, road map features, lateral navigation map features or a combination thereof.

In embodiments, the synthetic augmentation module 57 provides one or more range rings around and outer periphery of the graphical depiction of the vehicle 10 that are spaced a set distance away from the vehicle. That is, a set distance around the vehicle 10 in real world coordinates is scaled to image coordinates to provide an indication of distance from any obstacles in the live synthesized image data 40.

A target landing zone (not shown) may also be generated by the synthetic augmentation module 57 based on airport or other reference data. The airport data for the target landing zone may be geo-referenced as described previously so as to provide a realistic depiction of the location of the target landing zone. Further, a graphical depiction of the target landing zone may be retrieved from the airport or other reference data and suitably scaled and positioned in the augmented image data 64 to realistically reflect the real world position and appearance of the target landing zone. There could be a number of other types of geo-referenced targets included in the augmented image data 64 by the synthetic augmentation module 57. Other targets could be user selectable, system selectable, or transmitted from an external source. Other graphical depictions than target landing zone could be related to flight such as flightpath vector or other symbol relative to an aircraft.

The display generation module 54 is configured to render a display 100 for presentation through the display device 30 based on the augmented image data 64. The display generation module 54 outputs display data 42 embodying the combined projected image that additionally includes graphical augmentations. The display generation module 54 thus generates a display 100 including a live video of combined, projected and augmented video showing a surround view of the vehicle 10 based on image data 16 from respective cameras 12a to 12d as though from a single virtual camera. The display 100 is stabilized using inertial measurement data 52. Further, the display 100 shows a region beneath the vehicle 10, which has particularly utility in aircraft applications and provides enhanced situational awareness during landing operations.

FIG. 2 illustrates an exemplary display 100 generated by the image processing system 20 and presented on the display device 30. The display 100 is generated based on image data 16 from four cameras 12a to 12d mounted at front, left side, rear and side right positions on a ground vehicle 10. The fields of view $C_1$ to $C_4$ are marked in the display 100 although these would not necessarily be revealed in other displays. The fields of view $C_1$ to $C_4$ of adjacent cameras 12a to 12d around the outer periphery of the vehicle 10 partly overlap at corners of the vehicle 10. At least the field of view C1 of the first camera 12a includes a region underneath the front of the vehicle 10 (e.g. in a region beneath the front end of the vehicle 10 between the front wheels). The image data 16 from each camera 12a to 12d is sent to the image processing system 20 frame by frame. The image processing system 20 applies lens distortion correction, perspective transform, composite view (or image stitching) and synthetic augmentation processing as has been described herein. In the example of FIG. 2, the image processing system 20 projects the image data 16 onto a common reference plane that is on the ground as though a single virtual camera positioned above the vehicle 10 were providing frames of video data. The display 100 includes a synthetic vehicle augmentation 104 providing a graphical depiction of the vehicle 10. The graphical depiction of the vehicle 10 is from above so as to match with the vertical position of the virtual camera. The graphical depiction of the vehicle 10 is to scale in the display 100.

Continuing to refer to FIG. 2, the synthetic vehicle augmentation 104 includes an outer profile 110 and a see-through region 108 within the outer profile 110. The see-through region provides a window through the graphical depiction of the vehicle so that synthesized image data 40 for a region beneath the vehicle 10 can be seen. This provides the driver with a see through front end of the vehicle 10. The region can be extended to include all or most of the underside of the vehicle 10 or plural such see-through regions 108 could be provided. This allows a driver to be more aware of difficult terrain (e.g. obstacles) beneath the vehicle 10. The ability to effectively see through the floor of an aircraft will be particularly advantageous during landing operations. The display 100 further includes plural range rings 102 (three in the present embodiment) disposed around the vehicle at set intervals for enhanced obstacle awareness. Yet further, there is shown a vertically accentuated image artefact 106 in the form of seemingly stretched bollards. This is an inherent artefact of the image projection to the ground plane that will provide enhanced pilot awareness of obstacles in aircraft applications.

Figure 3:
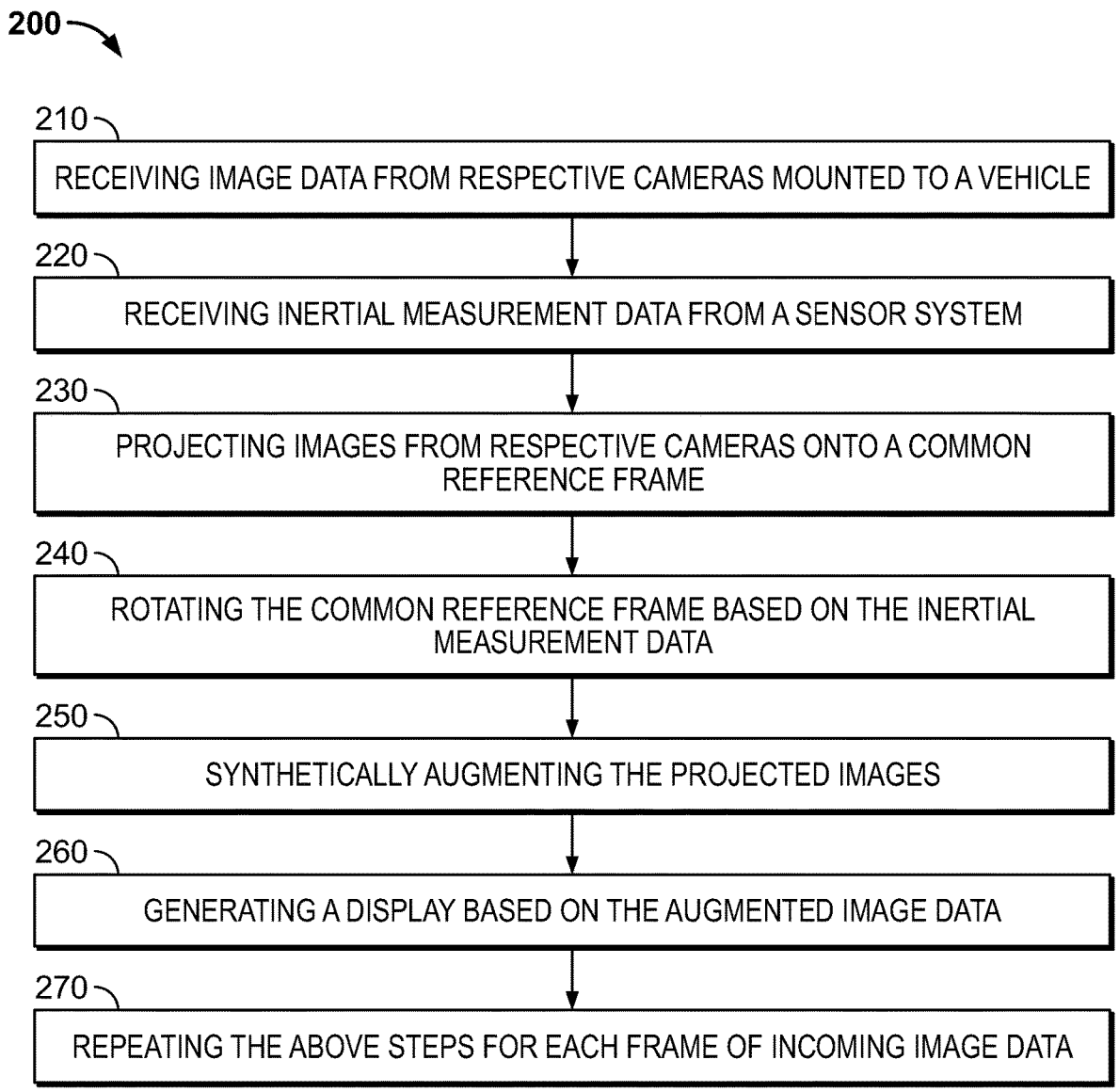
FIG. 3 depicts a method for generating a display, in accordance with an embodiment of the present disclosure.

FIG. 3 depicts a flow chart of a method 200, in accordance with the present disclosure. The method 200 is performed through the image processing system 20. Method 200 may commence on manual command from a user via the user interface 32, e.g. in preparation for parking or landing actions. Alternatively, method 200 may be continuously performed. In another alternative, the display system 8 may automatically determine certain upcoming actions of the vehicle 10 that will trigger method 200. For example, the progress of the vehicle may be tracked relative to a pre-planned route or landing or parking actions will be detected based on feedback from the sensor system 46 and these detections give rise to initiating method 200.

In step 210, image data 16 is received from the plurality of cameras 12a to 12d mounted to the vehicle 10. The image data 16 includes frames of images from each of the cameras 12a to 12d including images of different fields of views that include partially overlapping areas. The fields of view of the cameras 12a to 12d may, on aggregate, fully surround the vehicle 10.

In step 220, inertial measurement data 52 is received from the sensor system 46. The inertial measurement data 52 describes at least one of pitch, roll and yaw of the vehicle 10.

In step 230, respective images from each camera 12a to 12d included in the image data 16 are projected onto a common reference frame. This step is based on intrinsic and extrinsic camera parameters 26. The image processing system 20 further applies lens distortion correction and stitching operations so as to produce a single image as though captured by a single virtual camera located and focused so as to capture the common reference plane. In some embodiments, the common reference plane is located a certain distance beneath the vehicle 10. The certain distance may be preset or may be user selectable via the user interface 32. The common reference plane may be otherwise oriented so as to change the perspective of the virtual camera. Adjustments in the perspective of the virtual camera may be performed through the user interface 32. In step 240, the common reference plane is rotated based on the inertial measurement data so as to stabilize the virtual camera even when the vehicle 10 is pitching, rotating and/or yawing. The image processing system 20 corrects for the pitching, rolling and/or yawing according to the inertial measurement data 52.

In step 250, the synthesized image data 40 from step 230 is synthetically augmented. A scaled graphical depiction of the vehicle 10 is added, taken from the perspective of the virtual camera. The scaled graphical depiction may include one or more see through regions so that synthesized image data 40 capturing a region beneath the vehicle 10 is presented. Further, range rings 102 around the graphical depiction of the vehicle may be added. The synthesized image data 40 and the graphical depiction of the vehicle may be geo-referenced based on position data 56 and precisely located on a map based on map data 61 from the map database 58. The map data 61 may represent a plan map view, a terrain map, a road map, a map including buildings and infrastructure and a combination thereof.

In step 260, a display 100 is generated based on the augmented image data 64 from step 250. The display 100 is presented to the user via the display device 30 and provides enhanced situation awareness.

In step 270, steps 210 to 260 are repeated for each frame of image data 16 or for every predetermined number of frames of image data 16. In this way, frames of augmented image data 64 are continually provided at a set frame rate to provide a live video of the situation of the vehicle 10 from the perspective of a single virtual camera that is stabilized even in the face of rolling, pitching or yawing of the vehicle 10.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An image processing system for generating a display for a vehicle, the image processing system comprising:
   at least one processor configured to execute program instructions, wherein the program instructions are configured to cause the at least one processor to:
      receive images, respectively, from a plurality of cameras mounted on the vehicle, wherein the field of view of the plurality of cameras at least partially overlap, and wherein the field of view of at least one the plurality of cameras includes a region underneath the vehicle;
      transforming the images to a common reference plane using a perspective transformation algorithm and based on intrinsic and extrinsic parameters of the plurality of cameras, to thereby obtain a projected image, wherein the projected image is projected to the common reference plane; and
      generating the display based on the projected image, wherein the display includes a synthetic depiction of the vehicle including an outer profile and at least one range ring around the outer profile and wherein the display incudes an image area within the outer profile that is based on the projected image for the region underneath the vehicle,
      wherein each of the at least one range ring is spaced and disposed at a set distance away from the synthetic depiction of the vehicle.

2. The image processing system of claim 1, wherein the common reference plane is a horizontal plane.

3. The image processing system of claim 1, wherein the vehicle is an aircraft and wherein the program instructions are configured to cause the at least one processor to augment the display with a landing zone graphic, other target graphic or flight path vector.

4. The image processing system of claim 1, wherein the vehicle is an aircraft and wherein the common reference plane has an altitude or height relative to the aircraft that is a user selectable parameter.

5. The image processing system of claim 1, wherein the program instructions are configured to cause the at least one processor to receive inertial measurement data from a sensor system and to adjust the common reference plane based on the inertial measurement data.

6. The image processing system of claim 1, wherein the program instructions are configured to cause the at least one processor to receive inertial measurement data from a sensor system and to stabilize the projected image based on the inertial measurement data.

7. The image processing system of claim 1, wherein the vehicle is an aircraft and the program instructions are configured to cause the at least one processor to receive position data for the aircraft from a sensor system and to geo-reference the projected image based on the position data.

8. The image processing system of claim 1, wherein the vehicle is an aircraft and wherein the program instructions are configured to receive position data of the position of the aircraft, receive lateral map data, to determine a geo-reference for the projected image and to insert the projected image into a lateral map display using the geo-reference and the lateral map data.

9. The image processing system of claim 1, wherein the vehicle is an aircraft and the program instructions are configured to receive position data of the position of the aircraft, receive terrain data from a terrain database, to determine a geo-reference for the projected image and to combine the projected image and the terrain data in the display using the geo-reference.

10. The image processing system of claim 1, wherein a lateral distance of the projected image in the display is a user selectable parameter.

11. An image processing system for generating a display for a vehicle, the image processing system comprising:
at least one processor configured to execute program instructions, wherein the program instructions are configured to cause the at least one processor to:
receive images, respectively, from a plurality of cameras mounted on the vehicle, wherein the field of view of the plurality of cameras at least partially overlap;
receiving inertial measurement data from a sensor system;
adjusting a common reference plane based on the inertial measurement data;
transforming the images to the common reference plane using a perspective transformation algorithm and based on intrinsic and extrinsic parameters of the plurality of cameras, to thereby obtain a projected image, wherein the projected image is projected to the common reference plane; and
generating the display based on the projected image, wherein the display includes a synthetic depiction of the vehicle including an outer profile and at least one range ring around the outer profile and wherein the display incudes an image area within the outer profile that is based on the projected image for the region underneath the vehicle,
wherein each of the at least one range ring is spaced and disposed at a set distance away from the synthetic depiction of the vehicle.

12. The image processing system of claim 11, wherein the program instructions are configured to cause the at least one processor to include a synthetic depiction of the vehicle including an outer profile.

13. The image processing system of claim 11, wherein the inertial measurement data includes at least one of pitch, roll and yaw data.

14. An image processing system for generating a display for an aircraft, the image processing system comprising:
at least one processor configured to execute program instructions, wherein the program instructions are configured to cause the at least one processor to:
receive images, respectively, from a plurality of cameras mounted on the aircraft, wherein the field of view of the plurality of cameras at least partially overlap, and wherein the field of view of at least one the plurality of cameras includes a region underneath the aircraft;
transforming the images to a common reference plane using a perspective transformation algorithm and based on intrinsic and extrinsic parameters of the plurality of cameras, to thereby obtain a projected image, wherein the projected image is projected to the common reference plane; and
generating the display based on the projected image, wherein the display includes a synthetic depiction of the vehicle including an outer profile and at least one range ring around the outer profile and wherein the display incudes an image area within the outer profile that is based on the projected image for the region underneath the vehicle,
wherein each of the at least one range ring is spaced and disposed at a set distance away from the synthetic depiction of the vehicle.

15. The image processing system of claim 14, wherein the common reference plane is a horizontal plane.

16. The image processing system of claim 14, wherein the program instructions are configured to cause the at least one processor to augment the display with a landing zone graphic, other target graphic or flight path vector.

17. The image processing system of claim 14, wherein the common reference plane has an altitude or height relative to the vehicle that is a user selectable parameter.

18. The image processing system of claim 14, wherein the program instructions are configured to cause the at least one processor to receive inertial measurement data from a sensor system and to adjust the common reference plane based on the inertial measurement data.

19. The image processing system of claim 18, wherein the display indicates movement of the vehicle based on the inertial measurement data whereas ground is stabilized in the display by adjusting the common reference plane based on the inertial measurement data.

* * * * *